United States Patent [19]
Miyazawa

[11] Patent Number: 5,761,730
[45] Date of Patent: Jun. 2, 1998

[54] CONTROL DEVICE FOR CONTROLLING A CONNECTION BETWEEN AN ARITHMETIC PROCESSOR AND A MAIN MEMORY UNIT

[75] Inventor: Fumihiko Miyazawa, Yamanashi, Japan

[73] Assignee: NEC Corporation, Tokyo, Japan

[21] Appl. No.: 697,563

[22] Filed: Aug. 28, 1996

[30] Foreign Application Priority Data

Aug. 29, 1995 [JP] Japan ................................. 7-220419

[51] Int. Cl.$^6$ ................................. G06F 13/16
[52] U.S. Cl. ................................. 711/154; 711/1
[58] Field of Search ................................. 395/427, 481, 395/483, 485; 711/100, 154, 156, 158, 1, 2

[56] References Cited

U.S. PATENT DOCUMENTS

| | | | |
|---|---|---|---|
| 4,718,006 | 1/1988 | Nishida | 395/475 |
| 4,802,125 | 1/1989 | Yamada | 371/21.1 |
| 5,107,416 | 4/1992 | Jippo et al. | 395/800 |
| 5,163,144 | 11/1992 | Ikeno | 395/479 |
| 5,230,046 | 7/1993 | Iwata et al. | 395/181 |
| 5,251,311 | 10/1993 | Kasai | 395/471 |
| 5,432,923 | 7/1995 | Taniguchi et al. | 395/402 |

FOREIGN PATENT DOCUMENTS 2 254 457  10/1992  United Kingdom .
WO 91 20043  A 12/1991  WIPO .

OTHER PUBLICATIONS

C. Chin and W. Lin "A Massively Parallel Processing System Based on a Hyper–Crossbar Network," The 2nd Symposium on the Frontiers of Massively Parallel Computation, Oct. 10–12, 1988, pp. 463–466.

Primary Examiner—Tod R. Swann
Assistant Examiner—Conley B. King, Jr.
Attorney, Agent, or Firm—Foley & Lardner

[57] ABSTRACT

A control device is provided that controls a connection between a specific one of a plurality of arithmetic processors and a specific one of a plurality of main memory units in accordance with an access request supplied from the specific arithmetic processor. The access request has request tag information. A buffer section buffers the request tag information in response to a write-in address. A supplying section supplies the specific main memory unit with an additional access request having the write-in address as an identifier instead of the request tag information. When the specific main memory access ends, the specific memory unit supplies the control device with a reply signal having the identifier as a reply identifier. A read section reads the request tag information out of the buffer section in accordance with the reply identifier. The request tag information is delivered from the control device to the specific arithmetic processor.

4 Claims, 2 Drawing Sheets

CONTROL DEVICE FOR CONTROLLING A CONNECTION BETWEEN AN ARITHMETIC PROCESSOR AND A MAIN MEMORY UNIT

BACKGROUND OF THE INVENTION

This invention relates to a control device for use in a data processing system comprising a plurality of arithmetic processors and a plurality of main memory units and, more particularly, to a control device for controlling a connection between a specific one of the arithmetic processors and a specific one of the main memory units in accordance with request information which is supplied from the specific arithmetic processor to the control device.

It is known that a data processing system comprises a plurality of arithmetic processors and a plurality of main memory units. The data processing system may carry out a parallel processing in each of the arithmetic units. Such a processing system further comprises a control device for controlling a connection between a specific one of the arithmetic processors and a specific one of the main memory units in accordance with access request information which is supplied with the specific arithmetic processor to the control device.

Responsive to the access request information, the control device supplies the access request information to the specific main memory unit in order to access the specific main memory unit. The specific main memory unit carries out a write operation when the access request information is representative of a write access. When the write operation ends, the specific main memory unit supplies reply information to the control device. Supplied with the reply information, the control device delivers the reply information to the specific arithmetic processor.

The control device is coupled to the arithmetic processors by first interface units, respectively. Similarly, the control device is coupled to the main memory units by second interface units, respectively. For the description below, it will be assumed that the number of the arithmetic processors is equal to a positive integer M (where M is greater than one) and that the number of the main memory units is equal to a positive integer N (where N is greater than one). As the positive integer M increases, the number of the first interface units also increases. Similarly, the number of the second interface units increases as the positive integer N increases. When the first and the second interface units become large in number, it is difficult to construct the data processing system.

SUMMARY OF THE INVENTION

It is therefore an object of this invention to provide a control device for use in an easily constructable a data processing system comprising a plurality of arithmetic processors and a plurality of main memory units.

Other objects of this invention will become clear through the description hereinbelow.

With regard to this invention, the control device is for use in a data processing system comprising a plurality of arithmetic processors and a plurality of main memory units. The control device is for controlling a connection between a specific one of the arithmetic processors and a specific one of the main memory units in accordance with an access request supplied from the specific arithmetic processor. The access request has request tag information.

According to this invention, the control device comprises write-in address producing means for producing a write-in address in accordance with the access request, buffer means for buffering the request tag information as buffered request tag information in response to the write-in address, and supplying means supplied with the access request and the write-in address as an identifier for supplying the specific main memory with an additional access request having the identifier instead of the request tag information.

The specific memory unit supplies a reply signal having the identifier as a reply identifier when a main memory access ends. The control device further comprises read means responsive to the reply signal to read the buffered request tag information as a read request tag information out of the buffer means in accordance with the reply identifier, and delivering means for delivering the read request tag information to the specific arithmetic processor.

DESCRIPTION OF THE PREFERRED EMBODIMENT

Figure 1:
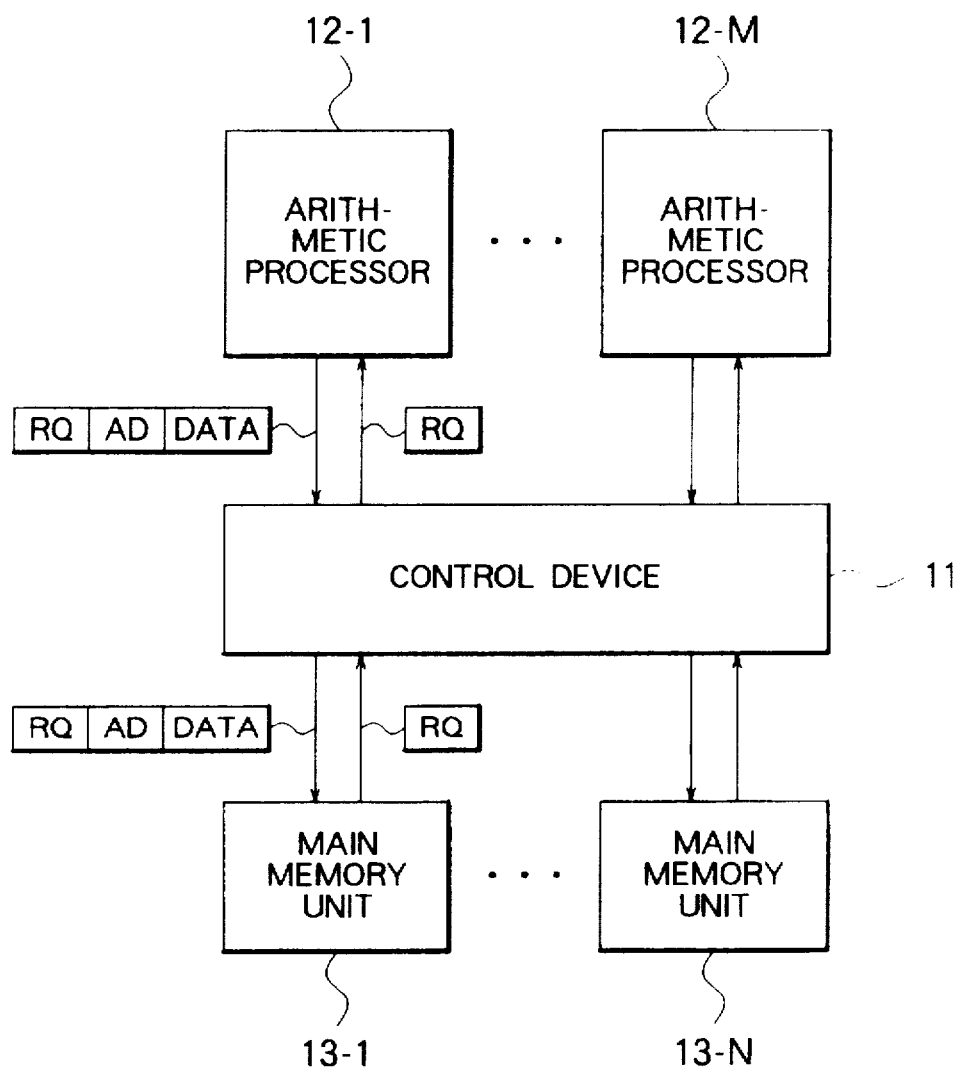
FIG. 1 is a block diagram of a conventional data processing system.

Referring to FIG. 1, a conventional control device will be described at first in order to facilitate an understanding of this invention. The control device 11 is for use in a data processing system comprising first through M-th arithmetic processors 12-1 to 12-M and first through N-th main memory units 13-1 to 13-N, where M represents a positive integer which is greater than one and N represents a positive integer which is greater than one. Each of the first through the M-th arithmetic processors 12-1 to 12-M is coupled to the control device by a first interface unit. Similarly, each of the first through the N-th main memory units 13-1 to 13-N is coupled to the control device by a second interface unit.

It will be assumed for discussion purposes that a specific one of the first through the M-th arithmetic processors 12-1 to 12-M accesses a specific one of the main memory units 13-1 to 13-N. The specific arithmetic processor may be, for example, the first arithmetic processor 12-1. The specific main memory unit may be, for example, the first main memory unit 13-1. When the first arithmetic processor 12-1 accesses the first main memory unit 13-1, the first arithmetic processor 12-1 supplies access request information to the control device 11. The access request information has a format comprising a request tag area (RQ), an address area (AD), and a data area (DATA). The request tag area carries a request tag representative of the content of the request. The address area carries an address. The data area carries data.

It will be assumed that the access request information is representative of a write access for the first main memory unit 13-1. Responsive to the access request information, the control device 11 supplies the access request information to the first main memory unit 13-1 in order to access the first main memory unit 13-1. The first main memory unit 13-1 carries out a write operation in accordance with the access request information inasmuch as the access request information is representative of the write access. When the write operation ends, the first main memory unit 13-1 supplies the control unit 11 with a reply signal having the request tag (RQ). Supplied with the reply signal, the control device 11 delivers the reply signal to the first arithmetic processor 12-1.

When the access request information is representative of a read access for the first main memory unit 13-1, the data area does not carry the data in the access request information. Otherwise, the reply signal carries read data which is read out of the first main memory unit 13-1.

In the example illustrated above, the number of the first interface units becomes large as the positive integer M increases. Similarly, the number of the second interface units increases as the positive integer N increases. When the first and the second interface units increases in number, it is difficult to construct the data processing system.

Figure 2:
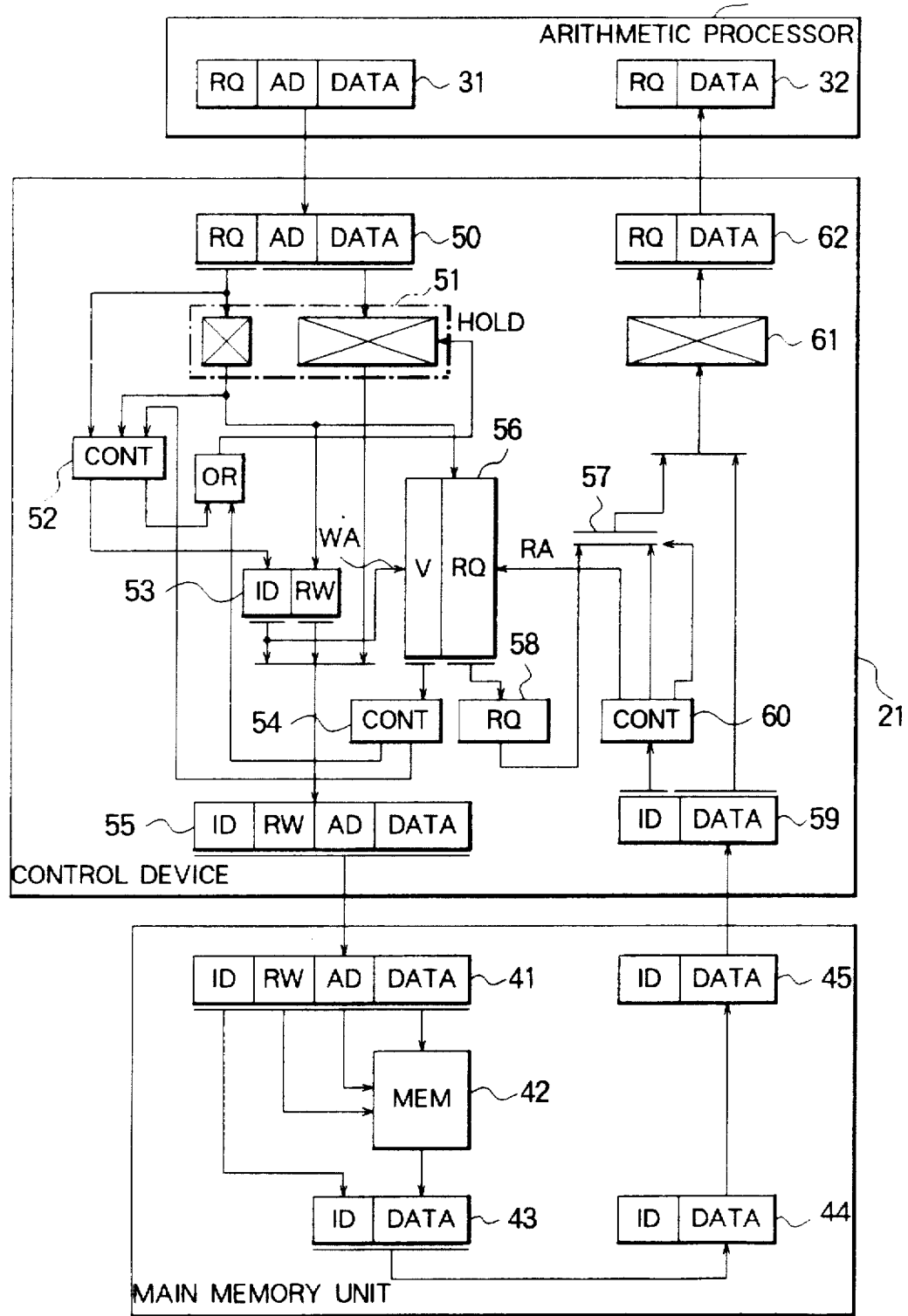
FIG. 2 is a block diagram of a data processing system comprising a control device according to a preferred embodiment of this invention.

Referring to FIG. 2, a description will be given of a control device according to a preferred embodiment of this invention. The illustrated control device is different in structure from the control device 11 illustrated in FIG. 1 and is therefore, designated by reference numeral 21. The control device 21 is coupled to the first through the M-th arithmetic processors (to 12-M) and the first through the N-th main memory units (13-1 to 13-N). In FIG. 2, only the first arithmetic processor 12-1 and the first main memory unit 13-1 are illustrated as a matter of description.

The first through the M-th arithmetic processors 12-1 to 12-M are similar in structure to one another. The first through the N-th main memory units 13-1 to 13-N are similar in structure to one another. On accessing one of the first through the N-th main memory units (13-1 to 13-N), the first through the M-th arithmetic processors (12-1 to 12-M) supply first through M-th access request information to the control device 21, respectively. The control device 21 selects one of the first through the M-th access request information, as will be described below, to supply the selected request information to one of the first through the N-th main memory units 13-1 to 13-N.

Responsive to memory accesses, the first through the N-th main memory units 13-1 to 13-N supply first through N-th reply signals to the control device 21, respectively. The control device 21 selects one of the first through the N-th reply signals as a selected reply signal, as will be described below, to supply the selected reply signal to one of the first through the M-th arithmetic processors 12-1 to 12-M.

Referring to FIG. 2, the first arithmetic processor 12-1 comprises a request output register 31 and a reply accept register 32. The first main memory unit 13-1 comprises a request accept register 41, a memory 42, and access time registers 43 to 45.

The control device 21 comprises a request accept register 50, an output crossbar switch 51, an order ensuring command control circuit 52, a write-in address register 53, a V-bit control circuit 54, an output request register 55, a request tag buffer 56, a selector 57, a request register 58, a reply address register 59, a reply control circuit 60, a reply crossbar switch 61, and a reply output register 62, all of which will be described later.

Although not shown in FIG. 2, each of the request accept register 50, the order ensuring command control circuit 52, and the reply output register 62 is provided in number of M. Similarly, each of the write-in address register 53, the V-bit control circuit 54, the output request register 55, the request tag buffer 56, the selector 57, the request register 58, the reply address register 59, and the reply control circuit 60 is provided in the number of N.

On accessing a specific one of the first through the N-th main memory units 13-1 to 13-N, the request output register 31 outputs first access request information in the first arithmetic processor 12-1. The specific main memory unit may be, for example, the first main memory unit 13-1. The first access request information is accepted in the request accept register 50. The second through the M-th arithmetic processors 12-2 to 12-M may output second through M-th access request information, respectively, on memory accessing.

When the first access request information is accepted in the request accept register 50, the output crossbar switch 51 carries out a contention process among the first through the M-th access request information in a known manner to select a selected one of the first through the M-th access request information.

It will be assumed that the selected access request information is the first access request information. The first access request information may have address information, write-in data, and request tag information representative of the content of the request. More particularly, the request tag information is information for use in indicating the end of processing for the first arithmetic processor 12-1. Therefore, it is unnecessary to supply the request tag information to the first main memory unit 13-1 except that the request tag information is representative of a read out command or a write-in command.

The request tag information is stored in the request tag buffer 56 in accordance with the output of the write-in address register 53. The output of the write-in address register 53 will be called a write-in address register output. The output register 55 supplies the first main memory unit 13-1 with the address information, the write-in data, and the write-in address register output as supplied access request information. Inasmuch as the data amount of the request tag information is greater than the data amount of the write-in address register output, the number of the second interface units is reduced between the control device 21 and the first main memory unit 13-1.

In the first main memory unit 13-1, the request accept register 41 accepts the supplied access request information. Responsive to the supplied access request information, a write-in access is carried out in the memory 42 in accordance with the address information and the write-in data.

In order to send a reply signal to the control device after a predetermined time duration lapses, the write-in address register output is held in turn in the access time registers 43 to 45. The predetermined time duration is equal to an access time. The write-in address register output is sent as the reply signal from the access time register 45 to the reply address register 59.

When the reply address register 59 accepts the reply signal, the reply control circuit 60 controls the request tag buffer 56 in accordance with the write-in address register output to read the request tag information as first request tag information out of the request tag buffer 56. The first request tag information is supplied to the reply crossbar switch 61.

In the manner described above, the second through the N-th main memory units 13-2 to 13-N may output reply signals. As a result, the reply crossbar switch 61 may be supplied with first through the N-th request tag information. The reply crossbar switch 61 carries out a contention process among the first through the N-th request tag information in a known manner to select one of the first through the N-th request tag information as selected request tag information.

It will be assumed that the selected request tag information is the first request tag information. The first request tag information is held in the reply output register 62. The first request tag information is sent from the reply output register 62 to the first arithmetic processor 12-1. In the first arithmetic processor 12-1, the reply accept register 32 accepts the first request tag information. Responsive to the first request tag information, the first arithmetic processor 12-1 detects the end of the request.

As is readily understood from the above description, a read out access is carried out in the memory 42 in accordance with the address information in order to read data as read data out of the memory 42. In this case, the supplied request information has the address information and the write-in address register output. The reply signal has the read data and the write-in address register output. The reply control circuit 60 reads the request tag information as the first request tag information out of the request tag buffer 56 in accordance with the write-in address register output carried by the reply signal. The read data and the first request tag information are sent from the control device 21 to the first arithmetic processor 12-1 in the manner similar to that described above.

As described above, the arithmetic processor, which produces the access request information, receives the reply signal on a main memory access. The arithmetic processor producing the request information may be called a request arithmetic processor. The arithmetic processor receiving the reply signal may be called a reply arithmetic processor. On the main memory access, the request arithmetic processor corresponds to the reply arithmetic processor. On an interprocessor communication, the request arithmetic processor does not correspond to the reply arithmetic processor. Taking the interprocessor communication into consideration, a fixed value is assigned to the write-in address register output which will be called a reply ID hereinbelow. The fixed value is representative of an interprocessor communication reply. More specifically, it will be assumed that the request tag buffer 56 is a buffer of 16 words. Four bits are assigned to the reply ID. As shown in Table 1, the reply ID is representative of "request invalidity" when the reply ID is "0000". When the reply ID is "0001" the reply ID is representative of "interprocessor communication reply". When the reply ID is one of "0010" to "1111", the reply ID is representative of "write-in address for the request tag buffer".

TABLE 1

| REPLY ID | | | | CONTENT |
|---|---|---|---|---|
| 0 | 0 | 0 | 0 | REQUEST INVALIDITY |
| 0 | 0 | 0 | 1 | INTERPROCESSOR COMMUNICATION REPLY |
| 0 | 0 | 1 | 0 | WRITE-IN ADDRESS FOR |
| 0 | 0 | 1 | 1 | THE REQUEST TAG BUFFER |
| 0 | 1 | 0 | 0 | |
| 0 | 1 | 0 | 1 | |
| 0 | 1 | 1 | 0 | |
| 0 | 1 | 1 | 1 | |
| 1 | 0 | 0 | 0 | |
| 1 | 0 | 0 | 1 | |
| 1 | 0 | 1 | 0 | |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | |

The reply control circuit 60 is supplied with the reply ID which is registered in the reply address register 59. The reply control circuit 60 judges whether or not the reply ID is representative of "interprocessor communication reply". When the reply ID is "0001", the reply control circuit 60 knows that the request tag information does not exist in the request tag buffer 56. The reply control circuit 60 produces reply request tag information in order to supply the reply request tag information to the first arithmetic processor 12-1.

In addition, it is necessary to control the request tag buffer 56 in order to prevent the request tag buffer 56 from an over-flow inasmuch as the capacity of the request tag buffer 56 is finite. In this event, the V-bit control circuit 54 carries out management of effective bits of each word in the request tag buffer 56. The effective bits are representative of whether or not the first main memory unit 13-1 is accessed. More particularly, the V-bit control circuit 54 monitors the V-bits of the request tag buffer 56 to detect the over-flow of the request tag buffer 56. Before the over-flow occurs, the V-bit control circuit 54 controls the output crossbar switch 51 to hold the output crossbar switch 51. As a result, supply of the access request information is restricted under the control of the V-bit control circuit 54.

In a case where the access request information is representative of an order ensuring command, it is necessary to restrict the execution of the order ensuring command until all of previous requests have been processed. The order ensuring command control circuit 52 is responsive to the order ensuring command and controls the execution of the order ensuring command. More particularly, the order ensuring command control circuit 52 restricts the execution of the order ensuring command until all of previous requests have been processed. The order ensuring command control circuit 52 detects that all of the V-bits of the request tag buffer 56 have become clear. When the all of the V-bits of the request tag buffer 56 become clear, the order ensuring command control circuit 52 knows that all of the previous requests have been processed.

What is claimed is:

1. A control device for use in a data processing system comprising a plurality of arithmetic processors and a plurality of main memory units, said control device for controlling a connection between at least one of said arithmetic processors and at least one of said main memory units in accordance with an access request supplied from said at least one arithmetic processor, said access request having request tag information, wherein said control device comprises:

write-in address producing means for producing a write-in address in accordance with said access request;

buffer means for buffering said request tag information as buffered request tag information in response to said write-in address;

supply means, supplied with said access request and supplied with said write-in address as a predetermined identifier, for supplying said at least one main memory unit with an additional access request, said additional access request having said predetermined identifier instead of said request tag information, said at least one memory unit supplying a reply signal having said predetermined identifier as a reply identifier when said at least one main memory access ends;

read means responsive to said reply signal for reading said buffered request tag information out of said buffer means in accordance with said reply identifier; and delivering means for delivering said read request tag information to said at least one arithmetic processor.

2. A control device as claimed in claim 1, a predetermined fixed value being representative of an interprocessor communication, wherein said control device further comprises:

judging means for judging whether or not said reply identifier is said predetermined fixed value, said judging means supplying said reply identifier as request tag information to said at least one arithmetic processor when said reply identifier is said predetermined fixed value.

3. A control device as claimed in claim 1, wherein said buffer means has a predetermined capacity, and further wherein:

said buffer means buffers an effective bit until said reply identifier is accepted; and said control device further comprising:

bit monitoring means for monitoring said effective bit to prevent a predetermined overflow state.

4. A control device as claimed in claim 1, wherein said access request is representative of an order ensuring command for use in ensuring an access order for said at least one main memory unit, wherein said control device further comprises:

executing means for executing said access request, said access request being executed after all previous access requests.

* * * * *